(12) United States Patent  
Haimov (10) Patent No.: US 7,644,058 B2  
(45) Date of Patent: Jan. 5, 2010

(54) APPARATUS AND PROCESS FOR CONJUNCTIVE NORMAL FORM PROCESSING

(76) Inventor: Eugene Haimov, 510 Romberg Dr., Sunnyvale, CA (US) 94087

( * ) Notice: Subject to any disclaimer, the term of this patent is extended or adjusted under 35 U.S.C. 154(b) by 473 days.

(21) Appl. No.: 11/788,800

(22) Filed: Apr. 20, 2007

(65) Prior Publication Data

US 2007/0282779 A1 Dec. 6, 2007

Related U.S. Application Data

(60) Provisional application No. 60/794,459, filed on Apr. 25, 2006.

(51) Int. Cl.  
*G06N 5/00* (2006.01)
(52) U.S. Cl. .......................................... 706/57; 706/45
(58) Field of Classification Search ................... 706/57, 706/45; 379/13, 198; 709/203  
See application file for complete search history.

(56) References Cited

U.S. PATENT DOCUMENTS 5,381,534 A * 1/1995 Shi ............................. 709/203  
5,414,762 A * 5/1995 Flisik et al. .................. 379/198  
5,488,648 A * 1/1996 Womble ....................... 379/13

* cited by examiner

*Primary Examiner*—Wilbert L Starks, Jr.  
(74) *Attorney, Agent, or Firm*—Jeffrey Sonnabend; SonnabendLaw (57) ABSTRACT

A method for analyzing system-problems, comprising the steps of: accepting from a user an input describing a system having a problem; parsing the user input to create a boolean representation of the system, the boolean representation comprising a series of equations; determining that the boolean representation comprises an unsatisfiable series of equations; for each equation in the series of equations, performing the steps of: creating a modified series of equations by removing the equation from the series of equations; and determining if the modified series of equations is satisfiable, and, if the modified series of equations is satisfiable, deriving a solution wording from the removed equation.

23 Claims, 2 Drawing Sheets

APPARATUS AND PROCESS FOR CONJUNCTIVE NORMAL FORM PROCESSING

CROSS-REFERENCE TO RELATED APPLICATIONS

This application claims priority to provisional application 60/794,459, filed on Apr. 25, 2006 entitled System and Method for Automated Problem Analysis and Solution

REFERENCE TO COMPUTER LISTING APPENDIX

Appendix A to this application is set forth on a single compact disc and the material recorded thereon is incorporated by reference herein. The following files are recorded on the compact disc:

| File Date | File Size (bytes) | File Name |
|---|---|---|
| Apr. 19, 2007 | 33,327 bytes | Cause_Effect_Analyzer_Annotated.txt |

A duplicate copy of the compact disc of Appendix A has also been submitted. Each of the discs was created on Apr. 19, 2007.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to a system and method for systems-related problem formulation, analysis and solution. More specifically, the instant invention is directed to a system and method for formulating, analyzing and solving system-related problems based on functional descriptions of such systems.

2. Background of the Related Art

Methods for solving systems-related problems are well known in the art. These include methods based on Genrich Altschuller's "Theory of Inventive Problem Solving", known generally by its Russian acronym, "TRIZ".

Methodologies based on classical TRIZ are difficult to apply because they do not readily identify the problems to be solved for complex systems. Certain patents attempt to solve such shortcomings. U.S. Pat. No. 5,581,663, for example, provides a graph based implementation which provides some problem identification functionality for complex systems.

Prior art systems such as that disclosed in U.S. Pat. No. 5,581,663 read system description and/or problem situation description in the form shown in Table 1.

TABLE 1

(Statement1) is required for (Statement2).
(Statement1) causes (Statement3).

This text may be understood as comprising nodes and node-links forming a graph. As the result, these systems build graphs whose nodes are the arbitrary user statements, called "functions," with arcs directed between such nodes.

Originally, graphs included only three types of links, namely, "is required for", "causes", and "eliminates" links. Subsequently, other solutions introduced other link types while generally remaining within the graph model.

After building graphs from user input (i.e., user text), prior art systems apply certain structural checks to the graphs such as incoming links compatibility, loop identification, "unconnected islands" identification, and the like, as will be readily understood by those of skill in the art. Upon concluding such structural checks, these systems formulate verbose renderings for each node of the graph; that is, they constructed word-based formulations for each graph node. This formulation takes into account the types of links of each node as well as the nodes in the immediate vicinity. For example, for the description of Table 1 above, the wordings would be:

TABLE 2

Find a way to eliminate (Statement3) under the condition of (Statement1).
Find an alternative way of (Statement1) that provides (Statement2) and does not cause (Statement3).
Find a way to provide (Statement2) that does not require (Statement1).

This graph based implementation, however, is static in nature, having no provision for hypothetical conditions, or "would-be" values at the nodes of the graph.

In addition to the undesirable static nature of the prior art graph based implementation, this approach does not differentiate between relevant and irrelevant conditions, as illustrated by the following example. One first considers the problem description of Table 3, below.

TABLE 3

(A) is required for (B).
(B) is required for (C).
(C) is required for (D).
(D) is required for (E).
(D) causes (F).

The "real" problem inherent in the instant example is located somewhere between the nodes (D), (E), and (F). However, the generated wordings would include all the "functions" in the chain, as depicted in Table 4, below.

TABLE 4

Find a way to eliminate (F) under the condition of (D).
Find alternative way of (D) that provides (E) and does not cause (F).
Find a way to provide (E) that does not require (D).
Find a way to provide (D) that does not require (C).
Find a way to provide (C) that does not require (B).
Find a way to provide (B) that does not require (A).

Thus, the verbose description of the graph inefficiently includes all "functions" and does not provide any focusing of an analyst's attention to the "functions" deserving of heightened scrutiny or additional analysis.

Another problem which the prior art does not address is the problem of "multi-path" cause-effect chains, such as the one illustrated in Table 5, below.

TABLE 5

Chain 1:

(A) is required for (X).
(A) causes (A1).
(A1) causes (A2).
(A2) causes (Y).
Chain 2:

(A) causes (B1).
(B1) causes (B2).
(B2) causes (Y).

In this graph, to eliminate (Y), one must eliminate both chains at the same time, i.e., chain (A)-(A1)-(A2)-(Y) and chain (A)-(B1)-(B2)-(Y). The prior art graph-based formulator would not recognize this multi-path issue, however, because the nature of its formulation is "local" to one node. Thus, the prior art graph-based formulator would produce the verbose wordings for each node independently.

A final problem left unaddressed by the prior art is that of analysis of alternative chains, as illustrated in Tables 6 and 7.

TABLE 6

(Flammable gas) causes (Explosion) [(A) causes (X)].
(Electrical spark) causes (Explosion) [(B) causes (X)].

TABLE 7

(Bacteria in the air) causes (Damage of medication) [(A) causes (X)]
(Overheat of medication) causes (Damage of medication) [(B) causes (X)].

In the graph of Table 6, one might state the problem as "Find a way to eliminate (Explosion) under the condition of (Flammable gas) and (Electrical spark)." Importantly, the two functions (i.e., "A" and "B") must both be present to cause the outcome (i.e., "X"). By contrast, one readily sees that the graph illustrated in Table 7 models a system in which the presence of either function causes the outcome (i.e., either "A" or "B" causes "X"). The prior art cannot express such alternatives.

It is therefore desirable to have a system for formulating, analyzing and solving system-related problems that allows for "would-be," non-static values at its nodes. It is further desirable to have a system for analyzing and solving system-related problems capable of identifying "functions" deserving of heightened scrutiny or additional analysis. It is also desirable to have a system for analyzing and solving system-related problems having multi-path cause-effects. Finally, it is desirable to have a system capable of analyzing alternative function chains.

SUMMARY OF THE INVENTION

The subject invention is directed to a new and useful system and method for formulating, analyzing and solving system-related problems that allows for "would-be" values at its nodes.

A preferred embodiment of the present invention discloses a method for analyzing system-problems, comprising the steps of: accepting from a user an input describing a system or situation having a problem; parsing the user input to create a boolean representation of the system or situation, the boolean representation comprising a series of equations; determining that the boolean representation comprises an unsatisfiable series of equations; for each equation in the series of equations, performing the steps of: creating a modified series of equations by removing the equation from the series of equations; and determining if the modified series of equations is satisfiable, and, if the modified series of equations is satisfiable, deriving a solution wording from the removed equation.

In the foregoing method, each equation in the series may comprise at least one target variable and at least one non-target variable, and the step of deriving a solution wording from the removed equation may comprise the steps of: finding a target variable in the equation; creating a list of positive non-target variables in the equation; creating a list of negative non-target variables in the equation; determining if the target is positive or negative; if the target is positive, generating a negative plain language expression of the target, otherwise generating a positive plain language expression of the target; for each variable in the list of positive non-target variables, generating a plain language statement of system condition; for each variable in the list of negative non-target variables, generating a plain language statement of omitted condition; generating a compound statement of system conditions by joining together the statements of system condition using a first logical operator between each of the statements of system condition, the first logical operator being "and"; and generating a compound statement of system omitted conditions by joining together the statements of system omitted condition using a second logical operator between each of the statements of system omitted condition, the second logical operator being "or".

Preferred embodiments of the present invention may also provide a method of representing the real-life problem situation in the form of the unsatisfiable system of boolean equations. In these embodiments, the user concepts (a.k.a. "Functions") may be modeled as boolean variables taking truth values TRUE (Function happens) and FALSE (Function does not happen), and the cause-effect and means-goals relations between the "functions" may be modeled by boolean equations comprising the system of boolean equations.

Additionally, preferred embodiments of the present invention include a method of expressing cause-effect and means-goals relations between the foregoing "functions" as "links": "is required for", "causes", "eliminates", "impedes" and their syntactical variations. These links may be interpreted as the boolean equations as follows:

[A] is required for [B] interpreted as ([A] or not [B]*),

[A] causes [B] interpreted as (not [A] or [B]*),

[A] eliminates [B] interpreted as ([A] or [B]*),

[A] impedes [B] interpreted as (not [A] or not [B]*)

where a star (*) represents a special "target" marker that is put on the "function" located on a particular side on the link. This marker may be used in wording formulation.

Still other preferred embodiments of the present invention include a method of expressing user requirements to the solution in the form of one-sided "links": "must achieve" and "must eliminate" and their syntactical variations. These links may be interpreted as boolean equations as follows:

must achieve [X] interpreted as ([X] or not [GOAL]*), must eliminate [X] interpreted as (not [X] or not [GOAL]*)

where [GOAL] is a special artificially added "function" and star (*) represents the special "target" marker.

Still other preferred embodiments of the present invention include a method of expressing the natural state of a problem situation in the form of one-sided "links": "always" and "never" and their syntactical variations. These one-sided "links" may be interpreted as boolean equations as follows:

always [X] interpreted as ([X]*), never [X] interpreted as (not [X]*).

Other preferred embodiments of the present invention include a method of expressing multi-"function" interactions in the form of the "function" lists located on the non-"target" side of the "link" and connection using conjunctions "with", "or" and/or "and". These functions may list as boolean equations as follows:

[$A_1$] with [$A_2$] with ... with [$A_N$] is required for [B]

interpreted as ([$A_1$] or not [B]*) and ([$A_2$] or not [B]*) and ... and ([$A_N$] or not [B]*)

and

[$A_1$] or [$A_2$] or ... or [$A_N$] is required for [B]

interpreted as ([$A_1$] or [$A_2$] or ... or [$A_N$] or not [B]*).

Further preferred embodiments of the present invention disclose a method of interpreting user statements having the same "target" function as boolean equations as follows:

[A] is required for [T].

[B] impedes [T].

interpreted as:

([A] or not [T]*) and (not [B] or not [T]*)

and

[A] causes [T].

[B] eliminates [T].

interpreted as:

(not [A] or [B] or [T]*).

The foregoing methods of the foregoing various embodiments may include a step of interpreting the user statements of more complex forms by reducing them to forms described for such embodiments using publicly known transformations of the boolean formulas. The methods of the foregoing various embodiments may further include a step of adding a special equation [GOAL] to the system of boolean equations constructed by such methods.

Finally, any of the previously described methods may include the step of generating wordings for the solutions based on the relaxations of the unsatisfiable system of boolean equations constructed by such methods, such relaxations transforming the unsatisfiable system of boolean equations into the satisfiable one. These methods may include a further step consisting of converting the unsatisfiable system of boolean equations into the Conjunctive Normal Form (CNF) and using this equivalent system to find the relaxations.

These and other aspects of the subject invention will become more readily apparent to those having ordinary skill in the art from the following detailed description of the invention taken in conjunction with the drawings described herein.

BRIEF DESCRIPTION OF THE DRAWINGS

So that those having ordinary skill in the art to which the subject invention pertains will more readily understand how to make and use the subject invention, preferred embodiments thereof will be described in detail herein with reference to the drawings.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

As used herein, program modules, software modules and like references indicate logical program units and do not necessarily indicate structurally discreet structures. The modules disclosed herein may be combined and/or further separated without departing from the inventive aspects of the present invention. Furthermore, the invention may be practiced in distributed computing environments wherein modules reside and/or are executed on several processing devices. In such a distributed computing environment, program modules may be located in both local and remote memory storage devices.

Figure 1:
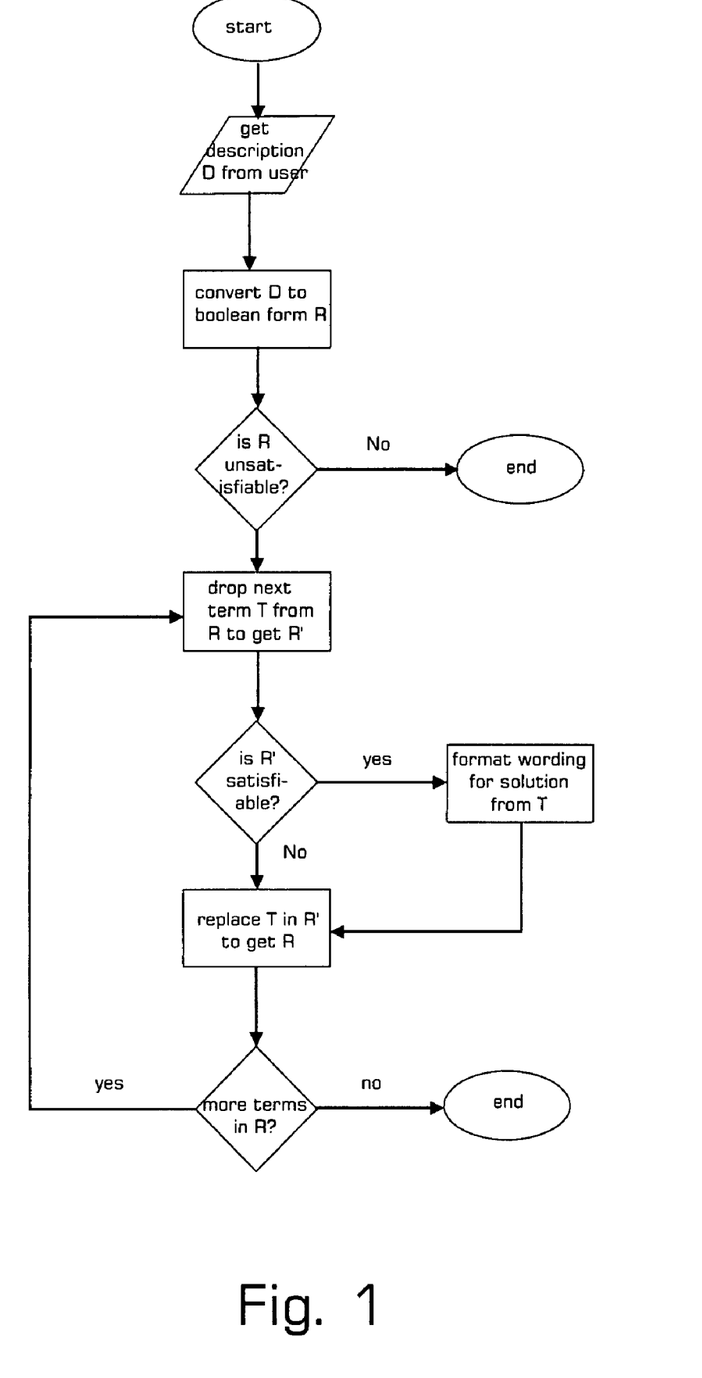
FIG. 1 is a flow chart of a method of a preferred embodiment of the present invention.
Figure 2:
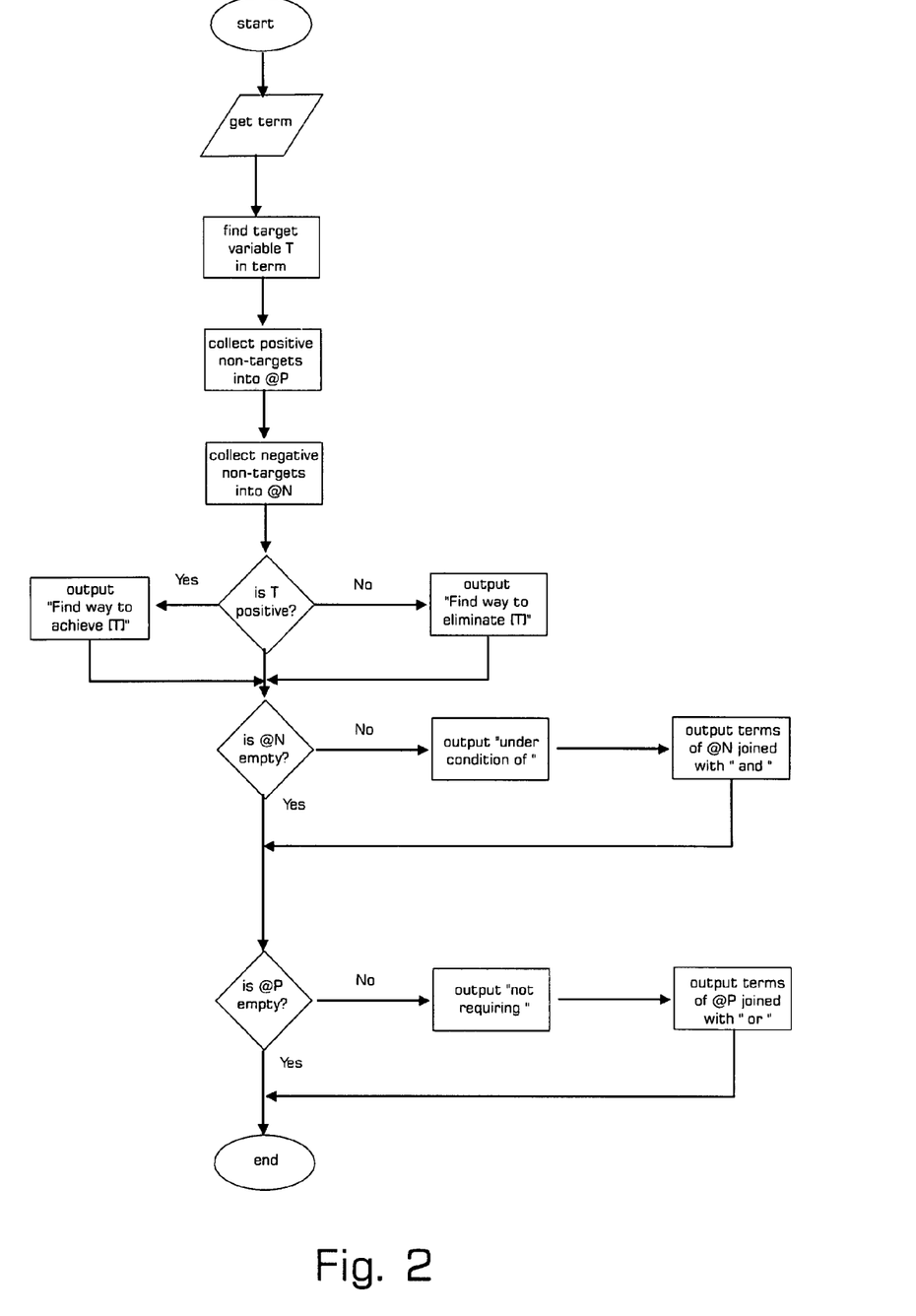
FIG. 2 is a flow chart of another method of a preferred embodiment of the present invention.

The logical flow of preferred embodiments of the present invention is depicted in FIGS. 1 and 2, and attention is directed to those figures in connection with the following discussion.

In a preferred embodiment of the present invention the problem system is modeled as an unsatisfiable boolean formula in conjunctive normal form (abbreviated "CNF"), as described in greater detail below. The solutions are sought as relaxations of the original formula. If removing a term from the CNF makes the remainder CNF satisfiable, then this removed term is regarded as a solution and undergoes the wording formulation in negated form. To facilitate entering the boolean formula, the end-user syntax is augmented with the keywords: "always", "never", "must achieve" and "must eliminate," which are absent from previously known systems and methods. The present invention also allows for expressing alternatives using the "or" keyword, also absent from previously known systems and methods.

Embodiments of the present invention need not begin analysis of systems with descriptions in CNF, but must convert non-CNF descriptions to CNF (that is, users need not input problems in CNF form, as certain embodiments of the present invention will convert input to CNF form). The use of CNF has several advantages, including: the input statements can be almost literally converted into the pieces of the CNF when utilizing the user language syntax previously describe, and Robinson's Resolution technique described below is specifically targeted to systems expressed in CNF.

As a first step, the system constructs a boolean representation for a problem to be analyzed and solved. In this step, each statement of the overall problem as provided by a user. The system analyzes the representations thus provided and extracts therefrom linked boolean "functions" (also called "boolean variables") which combine to provide a relation between the truth of each such function or variable. By way of example, the user input statement "Bacteria in the air causes damage of medication" may be analyzed to yield two boolean variables, namely: "bacteria in air" and "damage of medication". Thus, [Bacteria in the air]=1 would mean that bacteria is actually present in the air, while [Bacteria in the air]=0 would mean that they are in fact absent. In that regard, the user input statement above yields the relation between the truth values of these two variables. This relation may be stated using traditional if-then constructs such as: "if [Bacteria in the air]=1 then [Damage of medication] must be 1."

Alternatively, the relation may be stated in boolean form as: "^[Bacteria in the air]|[Damage of medication]", where the caret symbol ("^") signifies a not condition (i.e., the opposite of the boolean statement) and the pipe symbol ("|") signifies a logical "or". The alternative statement of the relation may be worded as "ALWAYS TRUE THAT: EITHER NOT [Bacteria in the air] OR (OTHERWISE) [Damage of medication]." Using the boolean statement form, the system of the present invention may represent several link types as depicted in Table 8, below.

TABLE 8

| Link | Formula | Interpretation |
| --- | --- | --- |
| [A] is required for [B]. | (A | ^B) | must do [A], or would not get [B] |
| [A] causes [B]. | (^A | B) | [A] must be absent, or would get [B] |
| [A] eliminates [B]. | (A | B) | must do [A], or would get [B] |
| [A] impedes [B]. | (^A | ^B) | [A] must be absent, or would not get [B] |

Each of the formulas in Table 8 above represents an equation that constraints the values of [A] and [B] certain way. Each formula depicted in Table 8 above evaluates to true, for example, [A] or [^B]=TRUE for the first entry, and so each formula may have certain values for [A] and [B] which evaluate to TRUE. Where a formula has at least one set of values for its variables that render the formula TRUE, it is said to be "satisfiable". Where a formula has no set of values for its variables the evaluate to TRUE (i.e., all combinations of variables evaluate to FALSE), the formula is said to be "unsatisfiable."

As will be readily understood by those of skill in the art, a system may be modeled by a series of related formulas which must be solved simultaneously in order to solve the "problem" of the system. Where such a series of formulas is incapable of simultaneous solution, the system "problem" is said to be unsolvable. By way of example, one may consider the system of an ore melting furnace having a system "problem" of furnace explosion caused by melting ore in the furnace and the desired outcome of producing metal by melting ore. The system may be modeled by the series of functions depicted in Tables 9-12, below, including the desired outcome (also called the system's "goal") in the latter two tables.

TABLE 9

[Melting Ore] is required for [Getting Metal].
[Melting Ore] causes [Furnace Explosion].

TABLE 10

[Melting Ore] | ^[Getting Metal]
[Melting Ore] | [Furnace Explosion]

TABLE 11

[Melting Ore] is required for [Getting Metal].
[Melting Ore] causes [Furnace Explosion].
must achieve [Getting Metal].
must eliminate [Furnace Explosion].

TABLE 12

[Melting Ore] | ^[Getting Metal]
[Melting Ore] | [Furnace Explosion]
[Getting Metal] | [GOAL]
[Furnace Explosion] | ^[GOAL]
[GOAL]

The first two formulas in Table 12 are equivalent to as the two formulas in Table 10. The third formula in Table 12 represents the link "must achieve [Getting Metal]." This third formula may be stated as "must [Getting Metal] or would not get [GOAL]." The fourth formula is similar to the third formula, representing the desired outcome of avoiding a furnace explosion. This fourth formulas may be stated as "must not have [Furnace Explosion] or would not get [GOAL]." #23-3. Finally, the last formula in Table 12 is added artificially to every formula to expresses the fact that one wants the [GOAL] to be TRUE, i.e. "achieved".

One of ordinary skill in the art will quickly recognize that the system of formulas depicted in Table 12 is unsatisfiable simultaneously, and therefore the system "problem" is also unsolvable. This conclusion may be confirmed through well known analysis methodologies such as Robinson's Resolution.

Searching for Solutions and Constructing the Wordings

As the foregoing discussion illustrates, a "problem", if modeled correctly, will necessarily result in an unsatisfiable set of boolean equations. This represents the user's belief that the problem at hand cannot be resolved in any "normal" or "known" or "available" ways. Thus, the search for an "innovative" solutions is warranted. The "innovative" solutions, in turn, would necessarily involve "violations" of some of the equations thus producing the directions that would be "unexpected" by the user. The present invention discloses an algorithm that builds these "violations" as will be discussed in greater detail presently.

Because the formulation of a system "problem" is built in the conjunctive normal form ("CNF"), embodiments of the present invention analyze the CNF system of formulas in an attempt to "relax" the system by dropping a term of CNF (i.e., dropping at least one formula from the system). If the resulting set of equations, i.e., the set with a term removed, proves to be satisfiable, then the dropped formula represents the constraint that needs to be "violated". This term is thus used to formulate an appropriate wording of a system problem's solution. If, on the other hand, the resulting set of equations remains unsatisfiable, then the removed formula is considered irrelevant to the system problem. Such irrelevant formulas result in no wording and are ignored for purposes of solving the system "problem" represented by the set of equations.

The method thus described may be summarized as shown in Table 13, below.

TABLE 13

Parse user input, create the boolean representation R.
Check that R is unsatisfiable.
For every term T in R
    Drop term (formula or equation) T from R resulting in R'
    If R' is satisfiable then
        Formulate a wording from term T
    End If
    Put the term T back into R' thus recreating original R.
    Continue with the next term.
End For In executing the step of "formulate a wording from term T" in the method of Table 13, the present invention must determine which wording to use from among several possible wordings. To choose the correct one, the present invention analyzes the cause-effect and means-goals relations expressed by the user and inherently embodied in the system of equations. Every equation may be considered designate one variable in it to be a "target," that is, an effect experienced by or in the system being modeled.

Referring to the set of equations depicted in Table 12, one will recognize the variables in the right-hand column each may be considered an effect experienced by or in the system at issue. These particular variables constitute the "targets" in the equations. One of skill in the art will readily understand that the designation of a variable as a "target" does not impact the manner in which the variable is treated for any boolean purposes; the "target" designation is only considered at the present stage of word form formulation. One of skill in the art will also readily understand that there has been no "target" designation in the final equation of the equation set depicted in Table 12, as this term had been added only to signify the desired ultimate outcome, and so no formulation is desired for it.

The wording for each term will be the negated form of the term; that is, if a term is positive, the system of the present invention will generate a negative plain language expression of the term, otherwise it will generate a positive plain language expression of the term. Thus, by way of example, if a target term is "^[A]" (negative), the system of the present invention will generate a wording such as "find a way to ACHIEVE [A]". Similarly, if a non-target term reads as "[B]" (positive), then the system of the present invention will generate a wording such as ". . . that would not require [B]." Such a statement may be called a "statement of system omitted condition" because it states a condition that is not required by the system, i.e., a condition omitted from the system. Finally, if a non-target term reads as "^[C]" (negative), then the system of the present invention will generate a wording such as ". . . under the condition of [C]." Such a statement may be called a "statement system condition" because it states a condition of the system that is (or is assumed to be) present.

The method of formulating appropriate wording thus described may be summarized as shown in Table 14, below.

TABLE 14

In the given term, find the target variable [T].
Collect the list of positive non-targets @P.
Collect the list of negative non-targets @N.
If target is positive then
    output "Find a way to eliminate [T] "
Else
    output "Find a way to achieve [T] "
End If
If @N is not empty then
    output "under the condition of"
    output join ( 'and', @N )
End if
If @P is not empty then
    output "that would not require "
    output join ( 'or', @P )
End if Applying this method to the system detailed in Table 12 above, one may drop the first equation (i.e., "[Melting Ore]|^[Getting Metal]"), yielding a wording of "find a way to achieve [Getting Metal] that would not require [Melting Ore]."

Expressing Multi-Function Relations

Preferred embodiments of the present invention can also model system problems having multiple-function relationships between variables, such as where two or more variables must be present concurrently to cause a particular outcome or where the presence of one of two or more variables causes a particular outcome.

By way of example of the former multiple-relationship, i.e, one where multiple variables must be present, one may consider the problem "[Flammable gas] with [Spark] causes [Explosion]," which may be rewritten as the boolean formula of Table 15, below.

TABLE 15

^( [Flammable gas] AND [Spark] ) | [Explosion]

Applying Morgan's Law to the boolean equation of Table 15, as one of skill in the art will readily understand, one is left with the boolean equation set depicted in Table 16, below.

TABLE 16

( ^[Flammable gas] | [Explosion] ) AND
( ^[Spark] | [Explosion] )

The equation set of Table 16 requires both the first equation, i.e., "^[Flammable gas]|[Explosion] " and the second equation, i.e., "^[Spark]|[Explosion]" to be solved simultaneously for the equation as a whole to be solved.

Next, as an example of the latter multiple-relationship, i.e., one where the presence of at least one of a group of variables is required for a particular outcome, one may consider the problem "[Carbon dioxide] or [Water] is required for [Quenching a fire]," which may be rewritten as the boolean formula of Table 17.

TABLE 17

[Carbon dioxide] | [Water] | ^[Quenching a fire]

A more complicated example of the foregoing may be illustrated by the user statement: "Some time ago, there was a problem that heating the ampule was causing the medication overheat and damage. The problem was solved by freezing the medication in advance, so that its temperature would not go as high while sealing the ampule." This statement may be converted to the statement system shown in Table 18, including the presumed desire for treatment and the inability of damaged medication to provide treatment.

TABLE 18

[Heating the glass ampule] is required for [Sealing Ampule].
[Heating the glass ampule] causes [Overheat of medication].
[Overheat of medication] causes [Medication damage].
[Freezing the medication in advance] eliminates [Overheat of medication].
[Medication] is required for [Treatment].
[Damaged medication] impedes [Treatment].
[Treatment].

The first four lines of the equation set of Table 18 may be re-written "[Freezing the medication in advance]|^[Heating the glass ampule]|[Overheat of medication]." Likewise, the penultimate two equations of Table 18 may be re-stated as "ABSENCE OF [Medication] causes ABSENCE OF [Treatment]" and "[Damaged medication] causes ABSENCE OF [Treatment]." From this restatement, it becomes clear that "ABSENCE OF [Medication]" and "[Damaged medication]" are just alternative ways to cause "ABSENCE OF [Treatment]." Thus, one can write informally: "(^[Medication]| [Damaged medication]) causes ^[Treatment]."

Applying this analysis to the "causes" links from Table 18 (i.e., the first four equations), one gets: "^(^[Medication]| [Damaged medication])|^[Treatment]." After applying Morgan's Law, one is left with: "([Medication] AND ^[Damaged medication])|^[Treatment]," which may be alternatively expressed through the application of the distribution law as: "([Medication]|^[Treatment]) AND (^[Damaged medication] |^[Treatment])."

In the foregoing example, it is important to note that because the statements that require such special treatment may be spread over the source of a user's description, a direct one-pass translation of the source into the CNF may not be possible. Instead, the source may first need to be converted into an intermediate representation where each "target" (e.g. "[Treatment]") would be associated with the lists of the appropriate "non-targets" (e.g. "[Medication]" and "[Damaged medication]"). Then, pieces of the CNF can be generated based on the combinations of the link types that connect the "target" with its "non-targets" in each case.

EXAMPLES OF ANALYSIS OF SYSTEM-PROBLEMS And FORMULATION OF SOLUTIONS

With the above discussion in mind, one may consider the following examples of a system-relate problem analyzed and solved by an embodiment of the present invention.

First, one introduces a plain-language description of the system and associated problem: "Metal is extracted from ore by melting it in a high temperature furnace. To cool down the brick walls of the furnace, water is pumped through the pipes enclosed within the walls. If a pipe cracks, water gushes through the brick wall into the hot furnace resulting in furnace explosion." The system of the present invention may initially transform this description, yielding the restatement depicted in Table 19, below.

An overly simplistic re-statement of the system-problem appears in Table 19.

TABLE 19

[Melting Metal] is required for [Extracting Metal].
[Melting Metal] with [Pipe Cracks] causes [Furnace explosion].
must achieve [Extracting Metal].
must eliminate [Furnace explosion].

The model of the system thus depicted is only partially correct, however, because it assumes that all the variables (i.e., "Function Statements") are free to take any truth value unless they are explicitly constrained. To express that "[Pipe Cracks]" do in fact happen, therefore, embodiments of the system of the present invention adds the "always" statement as shown in Table 20.

TABLE 20

[Melting Metal] is required for [Extracting Metal].
[Melting Metal] with [Pipe Cracks] causes [Furnace explosion].
always [Pipe Cracks].
must achieve [Extracting Metal].
must eliminate [Furnace explosion].

Next, embodiments of the present invention then analyze the problem's restatement, as previously discussed, yielding a possible solution set as shown in Table 21, below.

TABLE 21

Find a way to achieve [Extracting Metal] that would not require [Melting Metal].
Find a way to eliminate [Pipe Cracks].
Find a way to eliminate [Furnace explosion] under the condition of [Melting Metal] and [Pipe Cracks].
Find a way to achieve [GOAL] that would not require [Extracting Metal].
Find a way to achieve [GOAL] under the condition of [Furnace explosion].

Embodiments of the present invention may also analyze and solve system-problems which include alternative chains, for example, the system modeled in Table 22.

TABLE 22

[Melting Metal] or [Bio-extraction] is required for [Extracting Metal].
[Melting Metal] with [Pipe Cracks] causes [Furnace explosion].
always [Pipe Cracks].
must achieve [Extracting Metal].
must eliminate [Furnace explosion].
[Bio-extraction] causes [Metal extraction is too expensive].
must eliminate [Metal extraction is too expensive].

Applying the methodologies previously detailed, embodiments of the instant invention may analyze the foregoing system model, yielding a possible solution set as shown in Table 23.

TABLE 23

Find a way to eliminate [Pipe Cracks].
Find a way to eliminate [Metal extration is too expensive] under the condition of [Bioextraction].
Find a way to achieve [GOAL] that would not require Extracting Metal].
Find a way to achieve [Extracting Metal] that would not require [Melting Metal] or Bioextraction].
Find a way to eliminate [Furnace explosion] under the condition of [Melting Metal] and [Pipe Cracks].
Find a way to achieve [GOAL] under the condition of [Furnace explosion].
Find a way to achieve [GOAL] under the condition of [Metal extraction is too expensive].

Finally, one may consider the real world example of: "During the internal surgery, sponges are used to stop the blood and other body fluids from running through the area. When the surgery is done, the sponges need to be removed. However, doctors and the surgical team staff are unable to see the sponges well inside the patient after they are covered with the body fluids. They also miscount the number of sponges as they take them out. Thus, while they think that all of the sponges are accounted for, some may actually still be inside of the patient. If they are left inside, they usually cause medical problems later."

Embodiments of the instant invention may model the system thus described as shown in Table 24, below.

TABLE 24

[Surgery] requires [Surgeon can see area clearly].
[Surgery] causes [Surgery takes long time].
[Surgery takes long time] causes [People in surgical team get tired].
[Blood and body fluids] impede [Surgeon can see area clearly].
[Blood and body fluids] are eliminated by [Surgical sponges accumulate blood and body fluids].
[Surgical sponges accumulate blood and body fluids] causes [Surgical sponges get the color of blood and body fluids].
[Surgical sponges get the color of blood and body fluids] with [People in surgical team get tired] causes [Surgical sponges are difficult to see].
[Surgical sponges are difficult to see] causes [Surgical sponges are difficult to detect].
[Surgical sponges are difficult to detect] causes [Surgical Sponges are left inside when surgery is complete].
[Surgical Sponges are left inside when surgery is complete] causes [Health problems after surgery].
[Surgical sponges are difficult to detect] is eliminated by [Counting the surgical sponges].
[Counting the surgical sponges] causes [Using surgical sponges is difficult].
must achieve [Surgery].
must eliminate [Health problems after surgery].
must eliminate [Using surgical sponges is difficult].

Again applying the methodology of embodiments of the instant invention as previously detailed, the foregoing description may be analyzed to yield a possible solution set as shown in Table 25.

TABLE 25

| | |
|---|---|
| # 1 | Find a way to eliminate [Surgical Sponges are left inside when surgery is complete] under the condition of [Surgical sponges are difficult to detect]. |
| # 2 | Find a way to eliminate [Health problems after surgery] under the condition of [Surgical Sponges are left inside when surgery is complete]. |
| # 3 | Find a way to achieve [Surgery] that would not require [Surgeon can see area clearly]. |
| # 4 | Find a way to achieve [GOAL] under the condition of [Health problems after surgery]. |
| # 5 | Find a way to achieve [GOAL] that would not require [Surgery]. |
| # 6 | Find a way to eliminate [People in surgical team get tired] under the condition of [Surgery takes long time]. |
| # 7 | Find a way to achieve [GOAL] under the condition of [Using surgical sponges is difficult]. |
| # 8 | Find a way to eliminate [Surgical sponges are difficult to see] under the condition of [Surgical sponges get the color of blood and body fluids] and [People in surgical team get tired]. |
| # 9 | Find a way to eliminate [Surgery takes long time] under the condition of [Surgery]. |
| # 10 | Find a way to eliminate [Using surgical sponges is difficult] under the condition of [Counting the surgical sponges]. |
| # 11 | Find a way to eliminate [Surgical sponges are difficult to detect] under the condition of [Surgical sponges are difficult to see] that would not require [Counting the surgical sponges]. |
| # 12 | Find a way to achieve [Surgeon can see area clearly] under the condition of [Blood and body fluids]. |
| # 13 | Find a way to eliminate [Surgical sponges get the color of blood and body fluids] under the condition of [Surgical sponges accumulate blood and body fluids]. |
| # 14 | Find a way to eliminate [Blood and body fluids] that would not require [Surgical sponges accumulate blood and body fluids]. |

Flowing from the results shown in Table 25 are numerous possible real-world solutions to the system-problem, as detailed in Table 26, below.

TABLE 26

1 Find a way to eliminate [Surgical Sponges are left inside when surgery is complete] under the condition of [Surgical sponges are difficult to detect].
>> Attach a long and thin plastic thread to every sponge. Other ends of the threads should be attached to one easily visible device e.g. an upright standing next to the patient's bed. When the surgery is complete, these threads can be used to trace all of the sponges regardles of their visibility.
2 Find a way to eliminate [Health problems after surgery] under the condition of [Surgical Sponges are left inside when surgery is complete].
>> Change the material of the sponges so that they dissolve by themselves after a while if are left inside the patient's body.
6 Find a way to eliminate [People in surgical team get tired] under the condition of [Surgery takes long time].
>> A. Rotate people in the team. B. Prepare people in the surgical team by injecting (or letting them inhale) a substance that would stimulate their attention span.
8 Find a way to eliminate [Surgical sponges are difficult to see] under the condition of [Surgical sponges get the color of blood and body fluids] and [People in surgical team get tired].
>> Use the sponges that would glow in the light of a different spectrum, e.g. ultra-violet. The UV-lamps are already used in the suregery rooms.
11 Find a way to eliminate [Surgical sponges are difficult to detect] under the condition of [Surgical sponges are difficult to see] that would not require [Counting the surgical sponges].
>> Use the sponges that include some easily detectable markers. For example - every sponge should be made with a small metallic ball inside coated with sterilizable plastic. When the surgery is complete, the metal finder (similar to ones used in the airports) can be used to verify that all sponges are removed.
13 Find a way to eliminate [Surgical sponges get the color of blood and body fluids] under the condition of [Surgical sponges accumulate blood and body fluids].
>> Use the sponges that are pre-trated with a substance that would change its color to some high contrast color upon the contact with the blood and other body fluids.

Multi-Wordings For Multi-Path Relations

The method disclosed in Table 13, above, attempts to drop each CNF term in turn, analyzing after each drop turn to determine whether the resulting equation set results in a satisfiable formula. This algorithm removes a single CNF term at a time; it does not drop multiple CNF terms at any single step.

Certain system-problems cannot be solved by such an approach, and so other preferred embodiments of the present invention extended the algorithm of Table 13 to also search for pairs, triples, etc. of terms to drop. These "complex relaxations" (i.e., relaxations created by concurrently dropping multiple CNF terms) can be defined as the subsets of the CNF terms with the following properties: (A) dropping these terms from the original unsatisfiable CNF would result in the new CNF that will be satisfiable; and (B) no proper subset of a complex relaxation would produce a satisfiable CNF.

One method of constricting such complex relaxations of the instant invention starts with the single-term subsets (as in the method disclosed in Table 13). Those CNF terms satisfy property (A) (i.e., they represent simple relaxations), and such CNF terms are stored for use in further analysis of subsequent iterations of the present method. The next iteration generates all the two-term subsets and eliminate those containing any of the previously stored sets. This comparison with previously stored sets ensures that the new subsets satisfy property (B). The algorithm depicted in Table 26, below, illustrates this embodiment of the present invention

TABLE 26

Initialize empty list of relaxation sets RelSetList.
For SetSize = 1 to number of terms in CNF
   Generate all candidate relaxation sets of size SetSize.
   Eliminate any candidate relaxation set that properly contain any of TABLE 26-continued    the sets stored in RelSetList.
   Test all remaining candidate relaxation sets to see if dropping them would result in a satisfiable CNF.
   Eliminate those that don't.
   Formulate directions for the new complex relaxations.
   Add the new complex relaxations to the list RelSetList.
End For Reading Input from the Diagram Visual representation of the cause-effect and means-goals relations facilitates use of the instant invention and renders is more intuitive for users. Although the present embodiment departs from the graph-based approach, a different visual representation can be devised to capture a user's input. A graphical user interface (a "GUI") can be developed allowing for creation of the diagrams resembling, for instance, those commonly used for rendering depicting electronics circuitry. Such GUI would then essentially replace the step of syntactical processing of the user input described above. Although the interface may take any particular form, diagramming tools such as Microsoft Corp.'s Visio product may be used, given an appropriate integration application programming interface, to extract and process the user description from diagrams generated in such tools.

With the use of the diagram as the input media, much of the syntactical restrictions of the present embodiments may be eliminated, thus allowing for a much more complex relations to be expressed in a concise and clear manner. This would necessitate an extra step in processing to convert the arbitrary boolean formula from the diagram into the CNF form, which may be readily accomplished by those of ordinary skill in the art using well known algorithms.

While particular embodiments of the present invention have been shown and described, it will be apparent to those skilled in the pertinent art that changes and modifications may be made without departing from the invention in its broader aspects.

What is claimed is:

1. A method for analyzing system-problems, comprising the steps of:
   accepting from a user an input describing a system having a problem;
   parsing said user input to create a boolean representation of said system, said boolean representation comprising a series of equations;
   determining that said boolean representation comprises an unsatisfiable series of equations;
   for each equation in said series of equations, performing the steps of:
      creating a modified series of equations by removing said equation from said series of equations; and
      determining if said modified series of equations is satisfiable, and, if said modified series of equations is satisfiable, deriving a solution wording from said removed equation.

2. The method of claim 1, wherein said step of parsing said user input to create a boolean representation of said system includes the step of parsing at least one one-sided link.

3. The method of claim 2, wherein said step of parsing at least one one-sided link includes the step of making substitutions according to the following:

"must achieve" translates to "([X] or not [GOAL])"; and

"must eliminate" translates to "(not [X] or not [GOAL])";

where X is a desired outcome of said system and GOAL represents achieving said desired outcome.

4. The method of claim 2, wherein said step of parsing at least one one-sided link includes the step of making substitutions according to the following:

"always" translates to "([X])"; and

"never" translates to "(not [X])";

where X is a natural state of said system.

5. The method of claim 1, wherein said step of parsing said user input includes the steps of:
   determining at least one function contained in said user input;
   determining a target for each of said functions; and
   determining at least one connector for each of said functions.

6. The method of claim 5, wherein said step of parsing said user input to create a boolean representation of said system includes the step of parsing at least one one-sided link.

7. The method of claim 6, wherein said step of parsing at least one one-sided link includes the step of making substitutions according to the following:

"must achieve" translates to "([X] or not [GOAL])"; and

"must eliminate" translates to "(not [X] or not [GOAL])";

where X is a desired outcome of said system and GOAL represents achieving said desired outcome.

8. The method of claim 6, wherein said step of parsing at least one one-sided link includes the step of making substitutions according to the following:

"always" translates to "([X])"; and

"never" translates to "(not [X])";

where X is a natural state of said system.

9. The method of claim 5, wherein said step of determining at least one connector for each of said functions includes the step of assigning for each of said connectors a value selected from the group comprising "is required for", "eliminates", "causes" and "impedes".

10. The method of claim 9, wherein said step of parsing said user input includes the step of making connector substitutions according to the following:

"is required for" translates to "([A] or not [B])";

"causes" translates to "(not [A] or [B])";

"eliminates" translates to "([A] or [B])"; and

"impedes" translates to "(not [A] or not [B])";

where A is one of said functions and B is said target for said function.

11. The method of claim 10, wherein said step of parsing said user input to create a boolean representation of said system includes the step of parsing at least one one-sided link.

12. The method of claim 11, wherein said step of parsing at least one one-sided link includes the step of making substitutions according to the following:

"must achieve" translates to "([X] or not [GOAL])"; and

"must eliminate" translates to "(not [X] or not [GOAL])";

where X is a desired outcome of said system and GOAL represents achieving said desired outcome.

13. The method of claim 11, wherein said step of parsing at least one one-sided link includes the step of making substitutions according to the following:

"always" translates to "([X])"; and

"never" translates to "(not [X])";

where X is a natural state of said system.

14. The method of claim 1, each equation in said series comprising at least one target variable and at least one non-target variable, wherein said step of deriving a solution wording from said removed equation comprises the steps of:
   finding a target variable in said removed equation;
   creating a list of positive non-target variables in said removed equation;
   creating a list of negative non-target variables in said removed equation;
   determining if said target is positive or negative;
   if said target is positive, generating a negative plain language expression of said target, otherwise generating a positive plain language expression of said target;
   for each variable in said list of positive non-target variables, generating a plain language statement of system condition;
   for each variable in said list of negative non-target variables, generating a plain language statement of omitted condition;
   generating a compound statement of system conditions by joining together said statements of system condition using a first logical operator between each of said statements of system condition, said first logical operator being "and"; and generating a compound statement of system omitted conditions by joining together said statements of system omitted condition using a second logical operator between each of said statements of system omitted condition, said second logical operator being "or".

15. The method of claim 14, wherein said step of parsing said user input to create a boolean representation of said system includes the step of parsing at least one one-sided link.

16. The method of claim 15, wherein said step of parsing at least one one-sided link includes the step of making substitutions according to the following:

"must achieve" translates to "([X] or not [GOAL])"; and

"must eliminate" translates to "(not [X] or not [GOAL])";

where X is a desired outcome of said system and GOAL represents achieving said desired outcome.

17. The method of claim 15, wherein said step of parsing at least one one-sided link includes the step of making substitutions according to the following:

"always" translates to "([X])"; and

"never" translates to "(not [X])";

where X is a natural state of said system.

18. The method of claim 14, wherein said step of parsing said user input includes the steps of:

determining at least one function contained in said user input;

determining at least one connector for each of said functions; and determining a target for each of said connectors.

19. The method of claim 18, wherein said step of determining at least one connector for each of said functions includes the step of assigning for each of said connectors a value selected from the group comprising "is required for", "eliminates", "causes" and "impedes".

20. The method of claim 19, wherein said step of parsing said user input includes the step of making connector substitutions according to the following:

"is required for" translates to "([A] or not [B])";

"causes" translates to "(not [A] or [B])";

"eliminates" translates to "([A] or [B])"; and

"impedes" translates to "(not [A] or not [B])";

where A is one of said functions and B is said target for said function.

21. The method of claim 20, wherein said step of parsing said user input to create a boolean representation of said system includes the step of parsing at least one one-sided link.

22. The method of claim 21, wherein said step of parsing at least one one-sided link includes the step of making substitutions according to the following:

"must achieve" translates to "([X] or not [GOAL])"; and

"must eliminate" translates to "(not [X] or not [GOAL])";

where X is a desired outcome of said system and GOAL represents achieving said desired outcome.

23. The method of claim 21, wherein said step of parsing at least one one-sided link includes the step of making substitutions according to the following:

"always" translates to "([X])"; and

"never" translates to "(not [X])";

where X is a natural state of said system.

* * * * *